(12) United States Patent
Xiao et al.

(10) Patent No.: US 9,534,937 B2
(45) Date of Patent: Jan. 3, 2017

(54) DISTRIBUTED MICROWAVE FABRY-PEROT INTERFEROMETER DEVICE AND METHOD

(71) Applicant: Habsonic, LLC, Rolla, MO (US)

(72) Inventors: Hai Xiao, Rolla, MO (US); Jie Huang, Rolla, MO (US); Xinwei Lan, Rolla, MO (US); Ming Luo, Rolla, MO (US)

(73) Assignee: HABsonic, LLC, Rolla, MO (US)

( * ) Notice: Subject to any disclaimer, the term of this patent is extended or adjusted under 35 U.S.C. 154(b) by 94 days.

(21) Appl. No.: 14/341,944

(22) Filed: Jul. 28, 2014

(65) Prior Publication Data
US 2015/0036147 A1   Feb. 5, 2015

Related U.S. Application Data

(63) Continuation of application No. 61/860,008, filed on Jul. 30, 2013.

(51) Int. Cl.
*G01B 9/02* (2006.01)
*G01D 5/353* (2006.01)

(52) U.S. Cl.
CPC ................. *G01D 5/35312* (2013.01)

(58) Field of Classification Search
CPC ............ G01D 5/35312; G01D 5/35316; G01D 5/35383; G01D 5/3539; G01D 5/35393; G01B 9/02007; G01B 9/02084

USPC .......................................................... 356/480
See application file for complete search history.

(56) References Cited

U.S. PATENT DOCUMENTS

| | | | | |
|---|---|---|---|---|
| 2003/0154802 A1* | 8/2003 | Culshaw | ............... | D07B 1/145 |
| | | | | 73/800 |
| 2005/0046859 A1* | 3/2005 | Waagaard | .............. | G01B 11/18 |
| | | | | 356/478 |
| 2007/0009205 A1* | 1/2007 | Maleki | ................... | G02B 6/122 |
| | | | | 385/27 |
| 2009/0297155 A1* | 12/2009 | Weiner | ................... | H04B 10/00 |
| | | | | 398/115 |
| 2012/0174676 A1* | 7/2012 | Nyffenegger | .......... | G01V 1/186 |
| | | | | 73/647 |

* cited by examiner

*Primary Examiner* — Tarifur Chowdhury
*Assistant Examiner* — Jonathon Cook
(74) *Attorney, Agent, or Firm* — Senniger Powers LLP

(57) ABSTRACT

A device and method include a broadband light source in communication with a waveguide to provide a light signal for interrogating each of a plurality for sensors within the waveguide. An analyzer modulates the light signal with a microwave signal and demodulates and evaluates light signals reflected by the sensors. An amplitude and a phase of each reflected signal from each sensor is distinguished in the time domain and the modulated signal is reconstructed in the frequency domain.

15 Claims, 16 Drawing Sheets

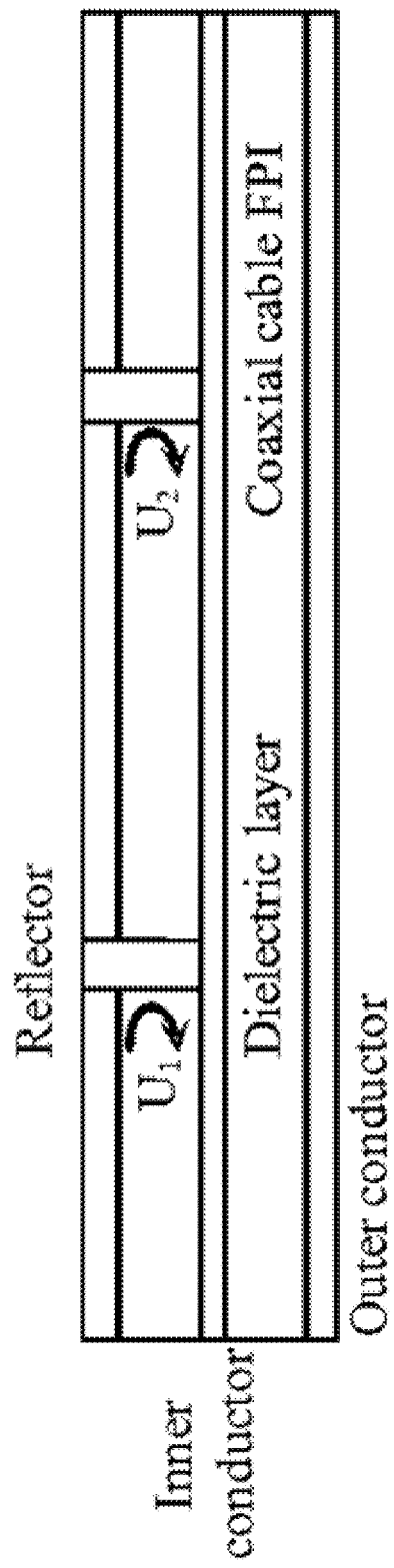

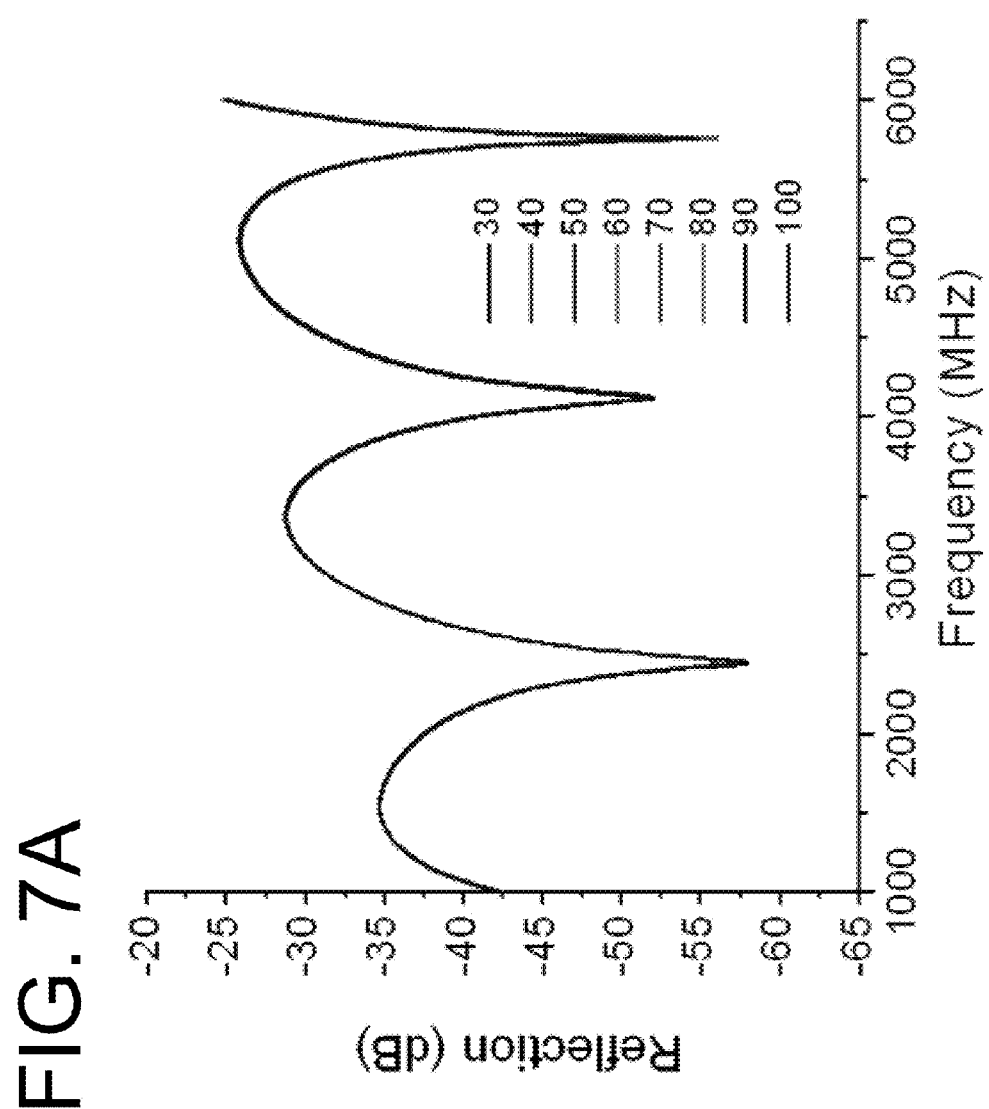

DISTRIBUTED MICROWAVE FABRY-PEROT INTERFEROMETER DEVICE AND METHOD

BACKGROUND

The present invention generally relates to interferometer devices and methods and their sensing application.

Distributed sensing technology replaces complex interrogation of thousands of sensors by a single waveguide (i.e. optical fiber cable or coaxial cable) that consists of many sensors in series. It makes almost continuous measurement over the full length of the cable instead of discrete measurement. Real time interrogation can also be implemented. As such, a truly continuous monitoring at all points along a cable can be obtained at all times through the technology of distributed sensing.

Several techniques have been suggested to realize distributed sensing. One technique is called frequency division multiplexing (FDM). The sensors on one cable have slightly different interrogated frequencies. A frequency-tunable source can be tuned to the frequency belonging to one particular sensor. The influences of the desired parameters such as strain or temperature could shift its interrogated frequency. The measurements can be further correlated by tracking the shift in frequency. Fiber Bragg gratings (FBGs) are typically used in FDM. It can have a high measurement resolution because of phase detection for each sensor. However, the maximum number of sensors along one cable in any case is typically between 10 and 100, limited by the tuning range or bandwidth of the light source and the required frequency interval per sensor.

Another technique, called time division multiplexing (TDM), uses cascaded weak reflectors along a cable. Each sensor/reflector is interrogated with short pulses in time domain. The reflections from different reflectors are then distinguished via the differences in time-of-arrival. This method could potentially multiplex more than 100 sensors but has a relatively low measurement accuracy.

SUMMARY

In one form, a device and method are described. A broadband light source in communication with a waveguide provides a light signal for interrogating each of a plurality for sensors within the waveguide. An analyzer modulates the light signal with a microwave signal and demodulates and evaluates light signals reflected by the sensors.

Other objects and features will be in part apparent and in part pointed out hereinafter.

BRIEF DESCRIPTION OF THE DRAWINGS

FIG. 2B illustrates a schematic of a coaxial cable Fabry-Perot interferometer (CCFPI).

FIG. 7A illustrates temperature responses of the second CCFPI along one coaxial cable according to aspects of the invention.

Corresponding reference characters indicate corresponding parts throughout the drawings.

DETAILED DESCRIPTION

In this invention, a distributed sensing demodulation device and method with high multiplexing capacity and high measurement accuracy is described. This device and method take advantages of TDM and FDM, which is herein called a joint-time-frequency demodulation technique. Each sensor along the cable comprises two reflectors which have a relatively weak reflection coefficient and insertion loss. Every two consecutive reflectors can be considered as a low finesse Fabry-Perot interferometer (FPI). The interferogram in spectrum domain of each individual FPI could be reconstructed via the proposed signal processing device and method. In one form, phase detection could be applied to any FPIs on one cable. In addition, all the sensors could be distinguished via time domain. As such, a large capacity sensing network with relatively higher measurement accuracy can be implemented simultaneously.

Figure 1:
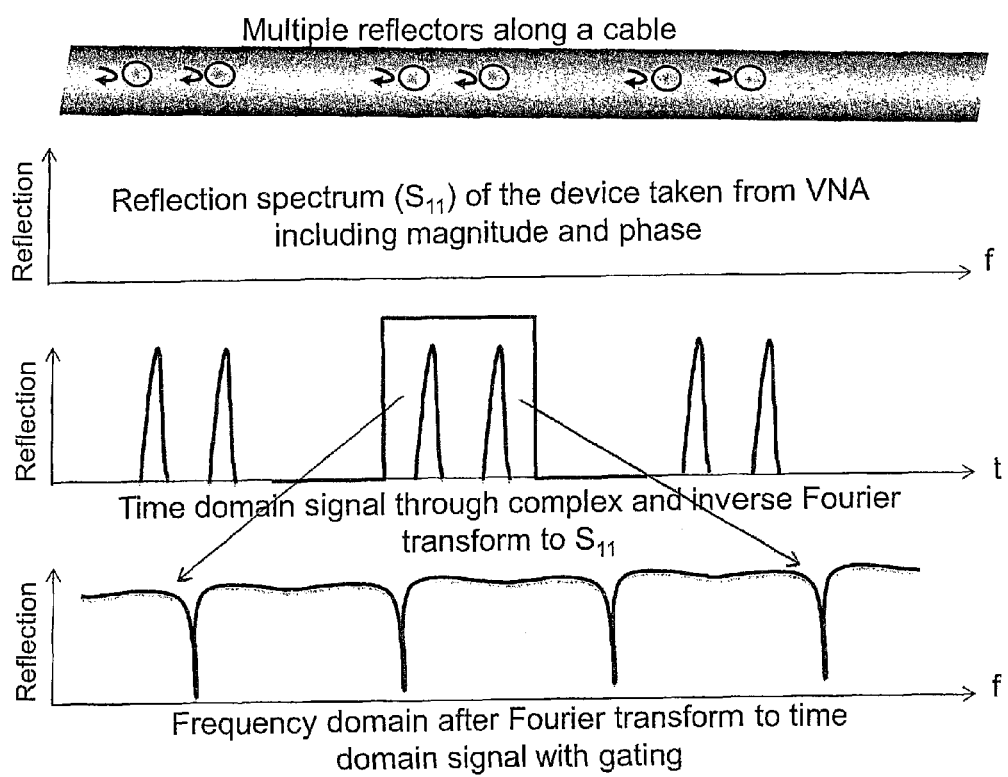
FIG. 1 illustrates waveforms of signal processing for distributed sensing.

FIG. 1 shows the device and method of signal processing for distributed sensing. Assume a cable comprises multiple reflectors. The first step is to obtain the reflection spectrum of the whole cable including magnitude and phase information. For example, the complex spectrum can be obtained from a conventional vector network analyzer (VNA). The next step is to achieve its time domain information through a complex and inverse Fourier transform to the measured reflection spectrum. This process functions as a joint time-frequency domain reflectometry. Multiple reflected pulses (sine shape pulses) could be observed in the waveform of time domain, and these reflections are corresponding to the location of each reflector along the cable. Select any two consecutive reflections through a gating function in time domain to filter out or isolate the unwanted signals. The two reflections in the applied window produces a FPI at a specific location. The interferogram in spectrum domain of the selected FPI can be obtained after applying another Fourier transform to the time domain signal with gating. As such, the interferograms of any FPI along the cable can be reconstructed and used for sensing application. The sampling rate or total sampling point of the reconstructed spectrum must be drastically decreased due to the applied observation window in time domain. This will further influence measurement resolution. In order to get the same sampling rate or number of point for the reconstructed spectrum, zero-padding needs to be added in time domain after adding a gating function. Zero-padding in time domain will give better resolution in spectrum domain and this is proved to improve the sensing performance in terms of measurement resolution. The cable with multiple FPIs can be considered as the linear superposition of many isolated FPIs with different initial distance. The applied observation window is used for isolating the FPI of interest or suppressing/filtering out the unwanted signal. Most of the information of the FPI is confined inside the applied window in time domain. The applied zero-padding in time domain is just to recover the original information of one isolated FPI on the entire length of the cable. In a sense, the interferogram in spectrum domain of each FPI can be reconstructed through this device and method, and it can be used for sensing by correlating its path difference to the parameters of interests. The FPIs can be designed to share the same bandwidth in spectrum domain so that the bandwidth of the source and the required frequency interval per sensor are not concerns to this device and method. The maxima number of sensors is only determined by the total transmission loss of the sensors and the cable. As a result, this device and method combine the unique features of both conventional FDM and TDM including a large capacity sensing network and high measurement resolution.

Here, we describe a sensing platform, coaxial cable FPI, for the demonstration of distributed sensing according to the invention. It is necessary to note that any sensing platform can be chosen to demonstrate this. The optical fiber based FPIs will also be described as a demonstration.

Coaxial Cable Fabry Perot Interferometer

In the past decades, fiber optic sensors have found many successful applications due to their unique advantages such as low loss, light weight, compactness, high resolution, and immunity to electromagnetic interference, remote operation, and multiplexing capability. For example, fiber Bragg gratings (FBG) have been widely investigated and successfully applied towards sensing applications since its first demonstration in 1978. FBGs have shown many advantages attributed to sensing application, such as high resolution inherent self-referencing capability, and easy multiplexing. Unfortunately, optical fibers are fragile and fiber optic sensors have a relative small dynamic range due to the limited deformability of silica glass. Even with rigorous packaging, fiber sensors can easily break when they are subject to large strains (about 0.4 mε or 0.4%) and/or a shear force, causing serious challenges for sensor installation and operation. As such, the applications of fiber optic sensors are limited in heavy duty or large strain measurement which is commonly desired in structural health monitoring (SHM).

One solution to the problem is to find another type of optical cable, for example a polymer optical fiber (POF), as the transmission medium with improved flexibility and robustness to survive the large strains. However, POFs have a large signal loss in optical communication frequencies and a large core size which supports many modes. As a result, it is difficult to obtain a POF sensor with high signal quality.

From the electromagnetic point of view, a coaxial cable performs a similar function as an optical fiber by transmitting an electromagnetic signal over a long distance. A typical coaxial cable comprises an inner and outer conductor sandwiched by a tubular insulating layer with a high dielectric constant. Governed by the same electromagnetic (EM) theory, a coaxial cable and an optical fiber share the common fundamental physics. However, the frequencies of the EM waves supported by them are quite different. The optical frequency is orders of magnitude higher than the radio frequency (RF). Over the years, optical fiber and coaxial cable technologies have evolved along quite different paths, resulting in unique devices of their own. In comparison with an optical fiber, a coaxial cable can survive a large strain and is relatively insensitive to lateral force or bending.

Inspired by the well-known FBG, we have recently successfully developed a new coaxial cable Bragg grating (CCBG) sensor. The large dynamic range, robustness and high resolution of the CCBG sensor provide a very promising and effective solution for SHM. However, the CCBG has a long gauge length (~1 m). As a result, the spatial resolution of the CCBG sensor is limited.

Figure 2A:
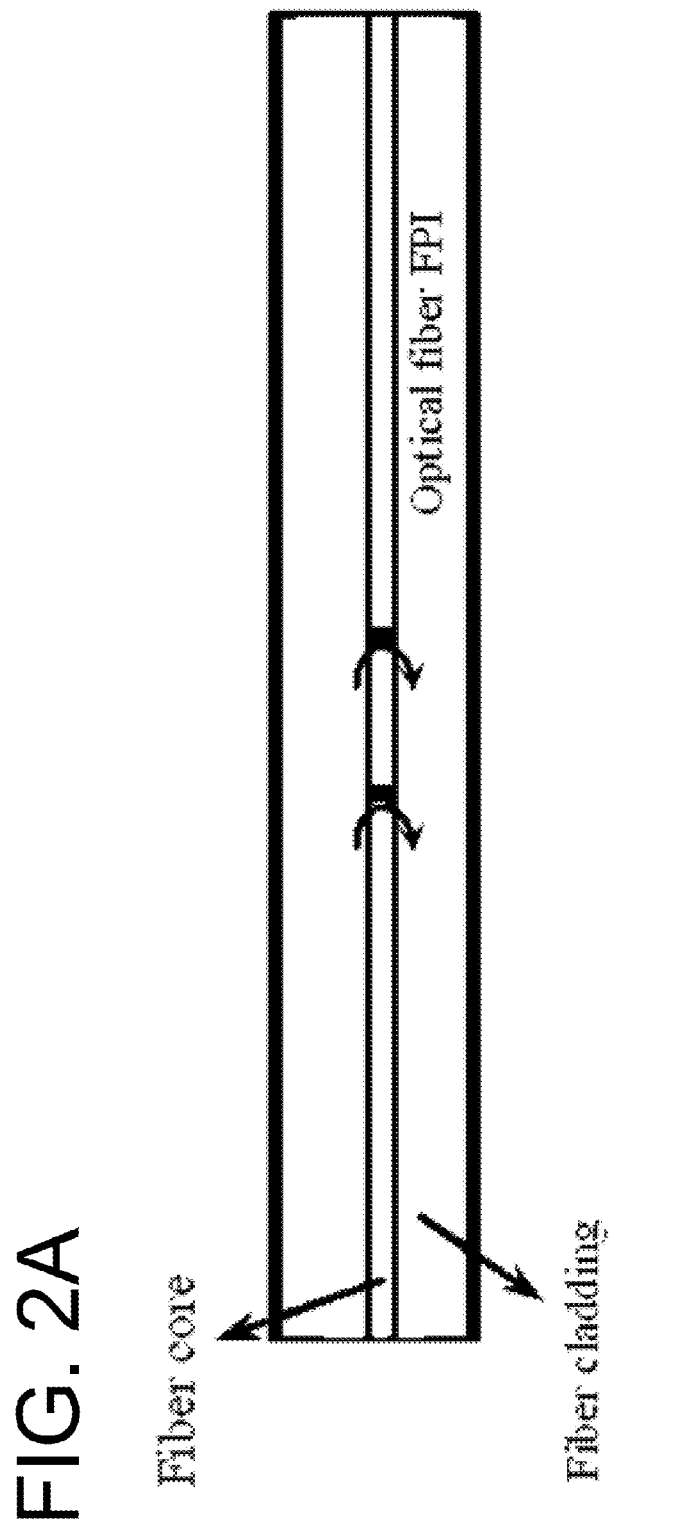
FIG. 2A illustrates a schematic of an optical fiber based Fabry-Perot interferometer (FPI).

Here we propose a new coaxial cable sensor platform to achieve high spatial resolution. The new sensor platform is inspired by the optical fiber inline Fabry-Perot interferometer (FPI). FPIs typically have comparable sensitivity with FBGs, but a much shorter length than FBGs. As shown in FIG. 2A, a FPI comprises a cavity formed by two reflectors with a typical separation of tens to hundreds of micrometers. Light waves reflected at the two reflectors have a different time delay, resulting in an interference signal (e.g., an interferogram in spectrum domain) that can be demodulated to find the optical length of the cavity. The variations in ambient temperature and/or strain will change the physical length or material properties of the medium between the two reflectors, leading to a shift in the interference pattern. This shift can be measured to find the ambient temperature or strain change.

Similarly, we can engineer the partial reflectors inside a coaxial cable to construct a coaxial cable Fabry-Perot interferometer (CCFPI). As shown in FIG. 2B, a CCFPI comprises a pair of partial reflectors separated by millimeters to centimeters. The EM wave traveling inside the cable is partially reflected at the first reflector while the remaining energy transmits through to reach the second reflector. At the second reflector, the EM wave is again partially reflected. The two reflected waves travel backwards and interfere coherently to generate an interference signal. When observed in the spectrum domain, the interference signal manifests itself as an interferogram.

The two reflectors can be engineered to have a low reflectivity. As a result, multiple reflections between two reflectors can be negligible in the calculation. Assuming the amplitude reflection coefficients of the two reflectors are the same, the two reflected waves (U1 and U2) can be written as follows:

$$U_1 = \Gamma(f)e^{-\alpha z}\cos(2\pi f t) \quad (1)$$

$$U_2 = \Gamma(f)e^{-\alpha z}\cos[2\pi f(t+\tau)]$$

$$\tau = \frac{2d\sqrt{\varepsilon_r}}{c}$$

where Γ(f) is the amplitude reflection coefficient of the reflector; f is frequency of the EM wave traveling inside the cable; α is the propagation loss coefficient; z denotes the cable axial direction; τ is time delay between the two reflected waves; d is the distance between two reflectors; $\varepsilon_r$ is the relative permittivity of the inner dielectric material of the cable; c is the speed of light in vacuum.

The two reflected waves have a time delay and the delay is associated with the distance between the two reflectors and the phase velocity of the wave. The interference signal (U) is the summation of the two reflected waves, which can be written as follows:

$$U=2\cdot\Gamma(f)e^{-\alpha z}\cos(2\pi f\tau)\cos[2\pi f(t+\tau)] \quad (2)$$

Equation (2) describes a wave with its amplitude given by $2\cdot\Gamma(f)e^{-\alpha z}\cos(2\pi f\tau)$ and its phase of $2\pi f\tau$. The amplitude and phase vary as functions of frequency and the delay. In essence, the amplitude of spectrum varies sinusoidally as the frequency of wave is scanned.

Figure 3A:
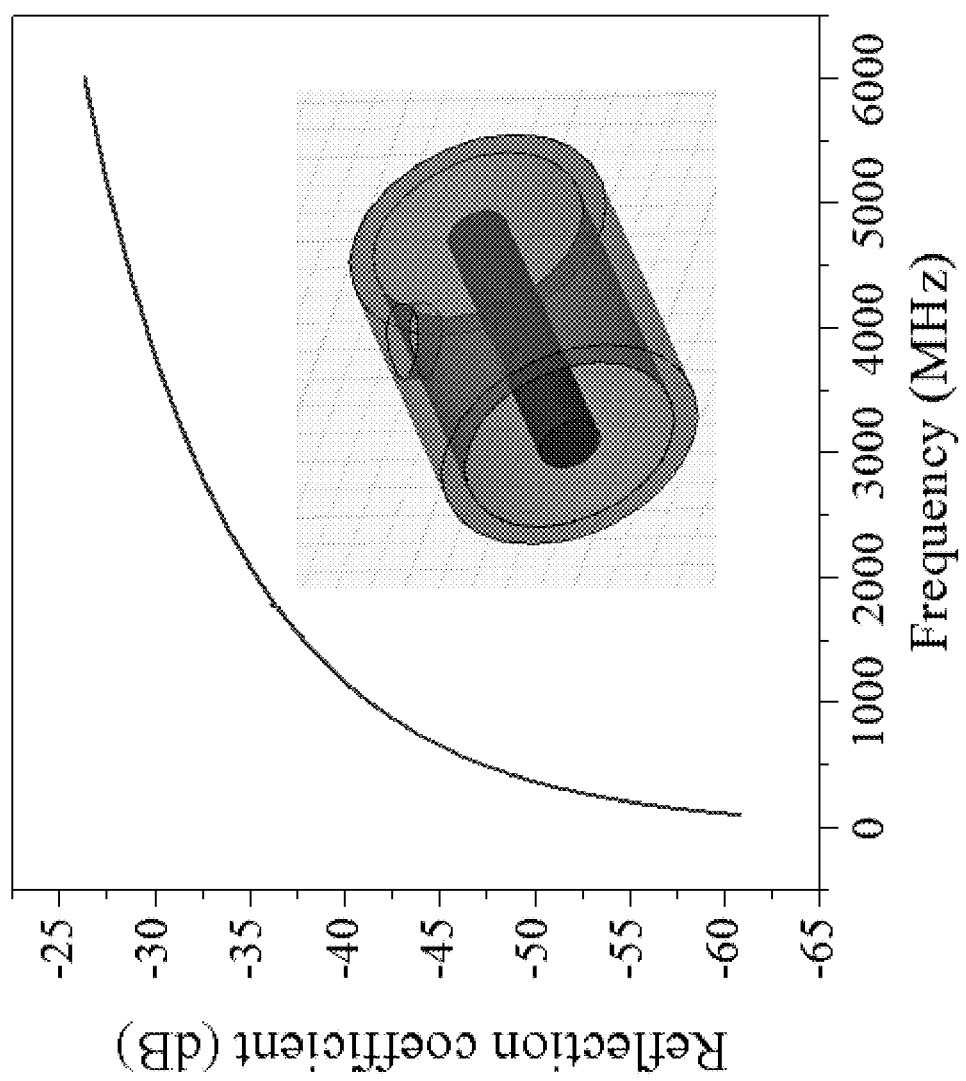
FIG. 3A illustrates a calculated reflection coefficient in magnitude of the proposed reflector on a coaxial cable.

In equation (2), the only unknown parameter is the reflection coefficient Γ(f). A partial reflector can be generated by introducing an impedance discontinuity in a coaxial cable. There are many methods to implant the impedance discontinuity. In our preliminary research, we used a simple method by drilling a cylindrical air hole into a coaxial cable without touching the inner conductor to avoid significant signal loss. The depth and size of the air hole can be varied to change the reflectivity. The reflection coefficient can be numerically simulated by a commercial full-wave solver including magnitude and phase at discrete frequency. FIG. 3A plots that the reflection coefficient (in magnitude) increased as the interrogated frequency increased.

To numerically calculate the interferogram of a CCFPI, the relative permittivity of the dielectric material was set to be 2.25 and α was 0.04 dB/m in the bandwidth of 0 to 6 GHz. The distance between two reflectors (d) was 60 mm. By substituting the calculated reflection coefficient in FIG. 3A, the interferogram of a typical CCFPI was plotted in FIG. 3B (red curve). Several resonant dips can be observed including fundamental frequency and its harmonics. The amplitude of the constructive interferences from 0 to 6 GHz followed the trends shown in FIG. 3B. The signal-to-noise ratio (SNR) was over 40 dB, indicating that it can be used for sensing after proper calibration. The quality factor (Q-factor) was ~5. Typically, the Q-factor for a FPI is associated with the reflectivity of each reflector and the transmission loss inside the cavity. The Q-factor increases as reflectivity increases or the loss decreases. People can make the Q-factor up to several thousand due to higher reflectivity and low loss. However, the reflection coefficient of each reflector in a CCFPI needs to be designed as low as possible (~−30 dB in FIG. 3B) due to the purpose of multiplexing capability.

The above investigation into device physics reveals that the resonant behavior mainly results from the coherent interference. The reflections are generated by impedance discontinuities as a result of interruption in material properties such as the permittivity and permeability or in cable parameters such as the resistance, capacitance or inductance. As such, there are many potential methods to create impedance discontinuity in a coaxial cable besides hole-drilling method. In addition, the reflection coefficient of discontinuity can be designed to obtain more complex reflection profile and this would require more involved analysis.

In practical measurement, measurement errors often occur due to the lack of data information or noisy measurement, and are often difficult to detect since the true value of the parameter under test is unknown. However, it can be numerically analyzed through proper assumption.

According to equation (2), the environmental parameters change (e.g., strain or temperature) will cause a change in time delay. Subsequently, the interference pattern will change. By tracking the shift in the interferogram, the changes of parameters can be found. In real operation, it is easy to follow the shift in the resonant frequency. The Nth resonant frequency can be deduced from equation (2), which is as follows:

$$f_N = \frac{N}{\tau} = \frac{Nc}{2d\sqrt{\varepsilon_r}} \quad (3)$$

In general, the stretch of the cable will cause an elongation to the cable and a decreasing to the dielectric constant due to the photoelasticity effect. These are the dominant factors that will further influence the interferogram. As a result, the applied strain (ε) can be expressed in terms of changes in distance and relative permittivity of the material ($\Delta\varepsilon_r$) using the following equation (4):

$$\varepsilon = \frac{\Delta d}{d} \text{ and } \frac{\Delta\varepsilon_r}{\varepsilon_r} \square -P_{eff}\varepsilon \quad (4)$$

where $P_{eff}$ represents the effective Pockels coefficient of the inner dielectric material of the coaxial cable. The $N_{th}$ resonant frequency shift ($\Delta f_N$) can be deduced from equation (3) and (4) as follows:

$$\Delta f_N = \frac{\partial f_N}{\partial d}\Delta d + \frac{\partial f_N}{\partial \varepsilon_r}\Delta\varepsilon_r \quad (5)$$

The applied strain (ε) in terms of Nth resonant frequency change ($\Delta f_N$) can be further derived from equation (5), as follows:

$$\varepsilon = \frac{2\Delta f_N}{f_N(\varepsilon_r P_{eff} - 2)} \quad (6)$$

Equation (6) describes that the applied strain can be calculated by simply measuring the $N_{th}$ resonant frequency shift ($\Delta f_N$) while assuming that the other parameters in the equation are initially known. The measurement error of strain $\Delta\varepsilon_{error}$) can be deduced from equation (6) as follows:

$$\Delta\varepsilon_{error} = \left|\frac{\partial\varepsilon}{\partial\Delta f_N}\Delta f_{N\_error}\right| = \left|\frac{2}{f_N(\varepsilon_r P_{eff} - 2)}\Delta f_{N\_error}\right| \quad (7)$$

where $\Delta f_{N\_error}$ represents the measurement error of the frequency shift. This value can be calibrated using high accuracy instrument. The measurement range (observation bandwidth of the spectrum) can be initially set to be small so that the $\Delta f_{N\_error}$ can be small if the sampling point of the instrument is fixed. Another observation is that the higher interrogated frequency ($f_N$) will have lower measurement error.

When the CCFPI is subjected to temperature variation, both the relative permittivity of the material and the length (d) will change due to the effect of temperature on the dielectric constant and the thermal expansion of the material, respectively. By using the same derivation method for strain measurement error, the temperature measurement error ($\Delta T_{error}$) can be expressed as follows:

$$\Delta T_{error} = \left| \frac{2}{f_N(2\alpha_{CTE} + \sqrt{\epsilon_r}\,\alpha_{TD})} \Delta f_{N\_error} \right| \quad (8)$$

where $\alpha_{CTE}$ and $\alpha_{TD}$ are the coefficient of thermal expansion and thermal effect on dielectric constant, respectively.

In order to precisely control the shape and depth of the drilled hole, a computer numerical controlled (CNC) drilling operator (Sherline P/N 8020A Model 2000) was used, where the minima feeding step of the 3 axes (x, y, z) is 10 μm. A vector network analyzer (VNA HP 8753ES) was used to in situ monitor the reflection spectrum during fabrication process. One end of the coaxial cable (50Ω, Jamco Electronics, RG-58) was launched to one port of VNA and the other end was matched with a 50Ω terminator. A drilling bit with diameter of 1/12 inch was used. All the machines including VNA were controlled by a computer. The distance between two holes was 60 mm. The drilling depth was 2.1 mm and the out diameter of the cable was 5 mm. The coaxial cable was properly calibrated by VNA before fabrication. The VNA was configured to with an observation bandwidth from 100 KHz to 6 GHz, a total of 1601 sampling points and intermediate frequency bandwidth (IFBW) of 10 KHz.

Figure 3B:
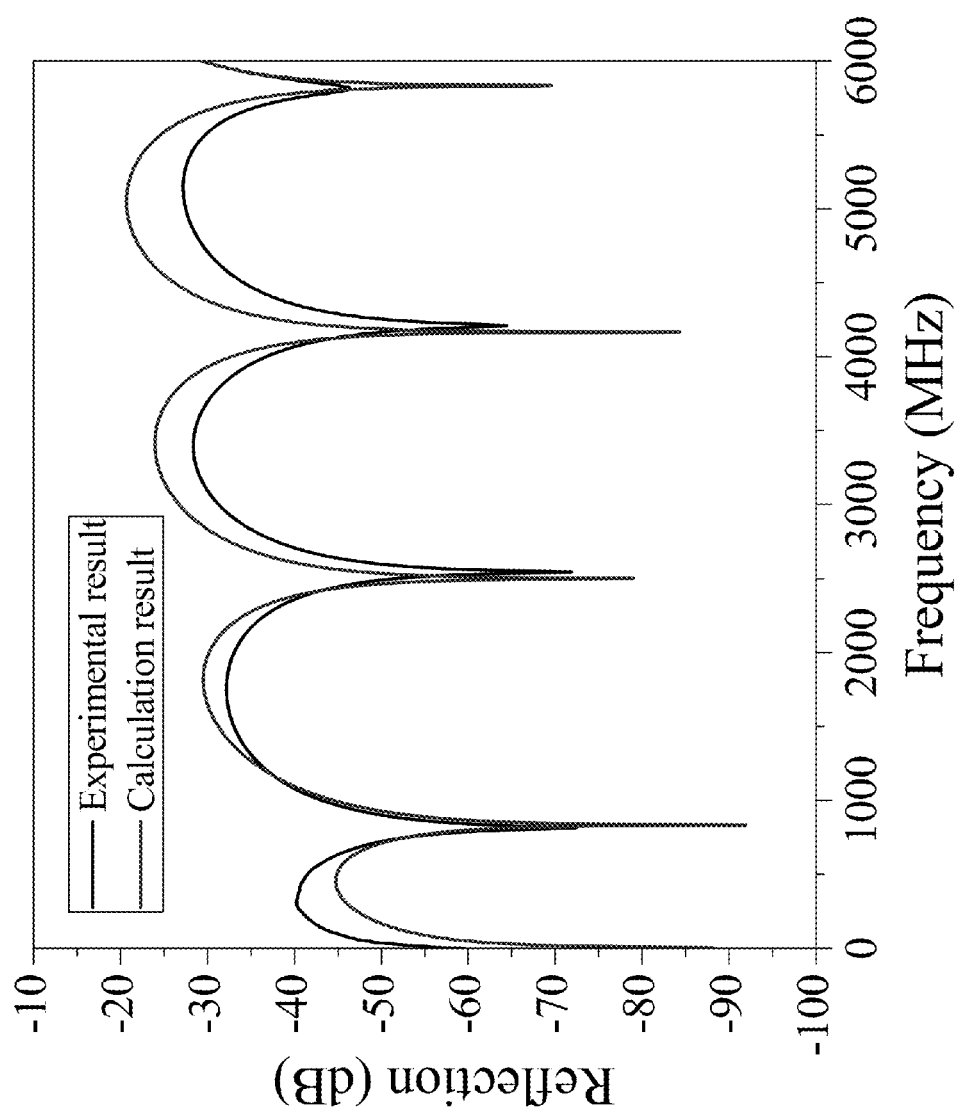
FIG. 3B illustrates measured and simulated interferograms of a CCFPI.

FIG. 3B plots the measured interferogram (black curve) of a CCFPI within the frequency range of 100 KHz to 6 versus the calculated interferogram (red curve). Several resonant frequencies can be observed including fundamental and harmonics. The SNR is over 40 dB. The Q-factor is ~5. The SNR and Q-factor matched well with the calculated data shown in FIG. 3B, indicating that the hole-drilling method did not incur in any extra loss to the cable. The resonant frequencies cannot be exactly matched because the relative permittivity of the inner dielectric material is frequency dependent, which is the similar with the chromatic dispersion in optics.

To demonstrate the capability of using CCFPI as a sensing device in SHM, temperature and strain measurement were conducted. The CCFPI used for temperature measurement had a distance of 60 mm. The VNA was configured to acquire the resonant frequency of ~4.2 GHz with an observation bandwidth from 3.6 to 4.8 GHz. The CCFPI was placed in a tubular furnace. The temperature was raised from 30° C. to 90° C. with an increasing step of 10° C. The rising time for each step was set to be 5° C./min. For each temperature point, the reflection spectrum was measured multiple times consecutively, and the averaged spectrum was applied to find the center frequency of the resonant peak. Fourth-order polynomial curve-fitting was applied to smooth the resonant peak for further improvement of the measurement accuracy.

Figure 4:
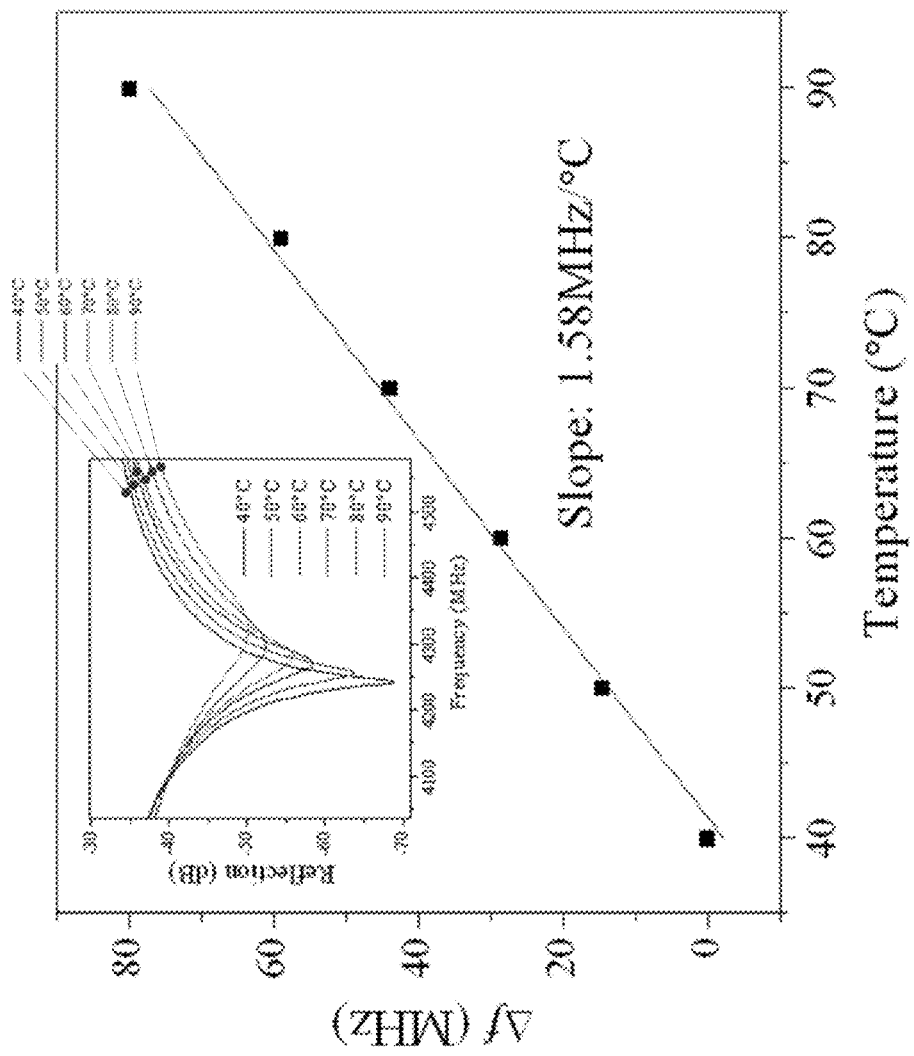
FIG. 4 illustrates a resonant frequency as a function of ambient temperature according to aspects of the invention. The inset in FIG. 4 illustrates the reflection (dB) v. frequency (MHz) for 40° C. at the top right graph to 90° C. at the bottom right graph in 10° C. increments.

FIG. 4 plots the change in resonant frequency as a function of the ambient temperature and the inset in FIG. 4 plots the shift in reflection spectra as the ambient temperature increases. The spectra shift to higher frequency region indicating that the effective length decreases as the temperature increases. The effective length is associated with the physical length between two reflectors and the relative permittivity of the inner dielectric layer. The decreasing in effective length indicates that the relative permittivity decreases as temperature increases. As a result, the change in relative permittivity is the dominant factor when CCFPI is subjected to temperature variation. The Q-factor of the dips decreased as the temperature increased indicating that the propagation loss between two reflectors decreases. The resonant frequency increases almost linear with a slope of 1.58 MHz/° C. as the temperature increased. The linear temperature-frequency shift relation indicates that CCFPI can be used as a sensor for temperature after it is properly calibrated.

Figure 5:
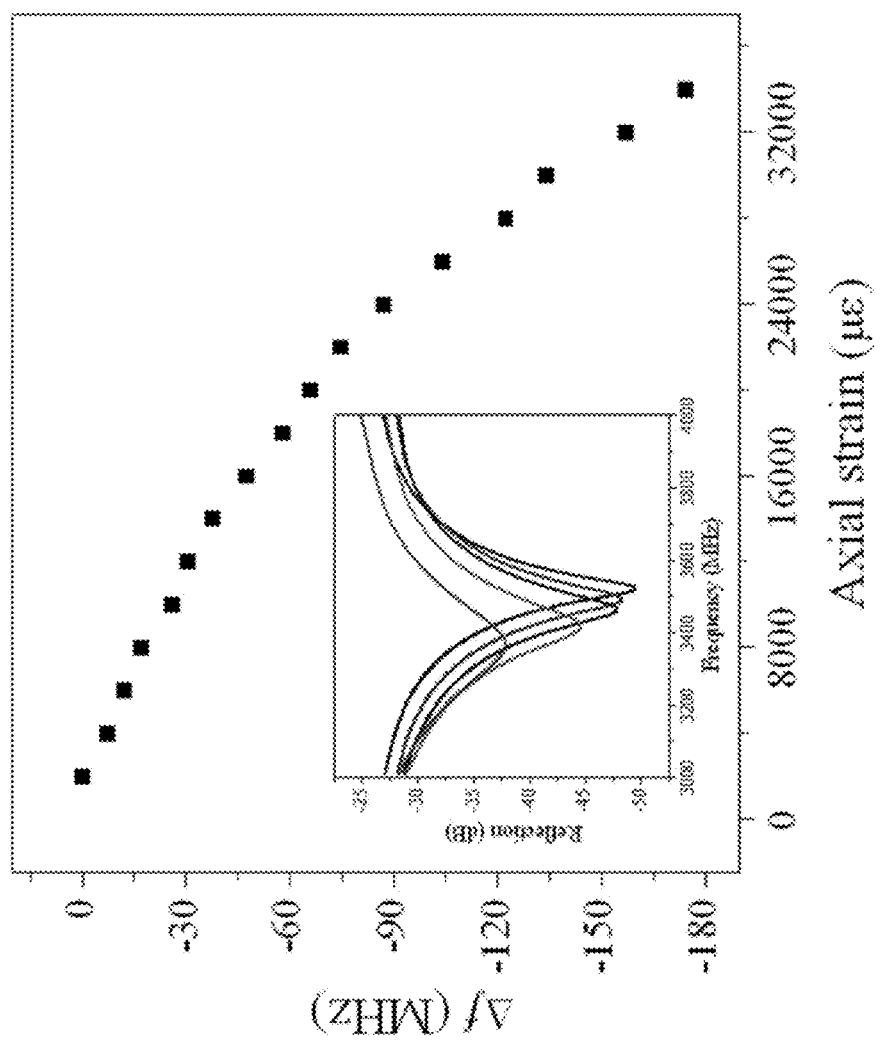
FIG. 5 illustrates a resonant frequency as a function of strain according to aspects of the invention.

It also has the potential in large strain measurement because the stretch of the CCFPI will directly increase the distance between two reflectors, resulting in a linearly decrease of the resonant frequency. In the strain test, the CCFPI had a distance of 70 mm and was fixed onto two translation stages. The gauge length (distance between two stages) was 500 mm. A pre-strain was initially applied to the cable before testing. After elongating the gauge length at a step of 1 mm, corresponding to a strain increase of 2000 με (0.2%), the reflection spectrum was acquired through VNA. Eighteen increasing steps or a total strain of about (34000 με) 3.4% were applied to the cable. FIG. 5 plots the change in resonant frequency as a function of the applied strain. The inset plots the shift in reflection spectra as the axial strain increased. The spectra shifted to the lower frequency range, which can be predicted in (2). The quasi-linear strain-frequency shift relation (~3.3 KHz/με) indicates that CCFPI can be used as a sensor for large strain measurement after it is properly calibrated.

Coaxial Cable Based Fabry Perot Interferometer

Figure 6:
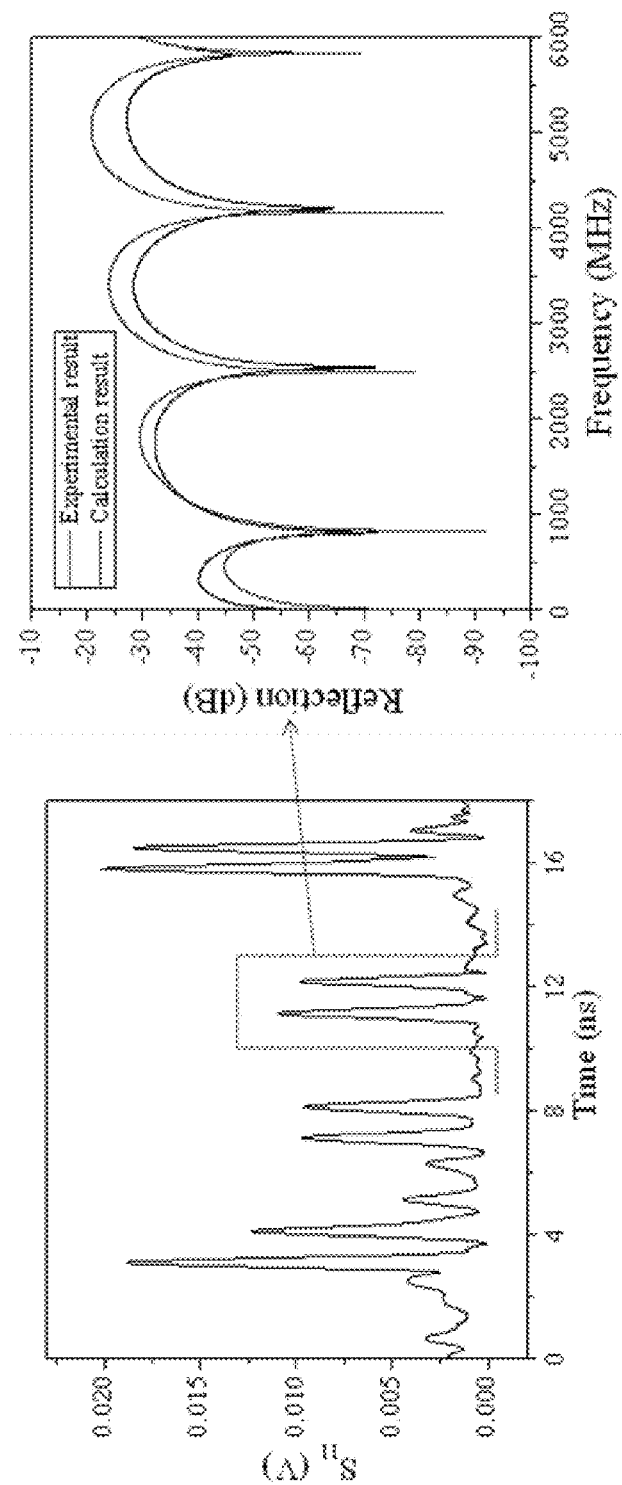
FIG. 6 illustrates on the left a Proof of Concept for a time domain signal after applying a complex inverse Fourier transform to the spectrum according to aspects of the invention, and illustrates on the right a Proof of Concept isolating and reconstructing a CCFPI from a series CCFPIs according to aspects of the invention.

To demonstrate the proposed device and method for distributed sensing, four sections of CCFPIs are separated periodically by 150 mm on a coaxial cable, respectively. Each CCFPI has a distance of 60 mm between two reflectors. A complex and inverse Fourier transfer is applied to the reflection spectrum taken by a VNA. The result is the time domain reflectometry of the multiple CCFPIs as shown in FIG. 6 on the left. The eight reflectors along the coaxial cable can be clearly identified in time domain. It is the coherent superposition of every two consecutive reflections that introduces the interference pattern in frequency domain as shown in FIG. 6 on the right. The time domain reflectometry also reveals that the key to obtaining a large fringe visibility of the interference signal is to have equal amplitude of the two reflections. As shown in FIG. 6 on the right, the interferogram in spectrum domain of the third CCFPI can be reconstructed through this device and method.

Figure 7B:
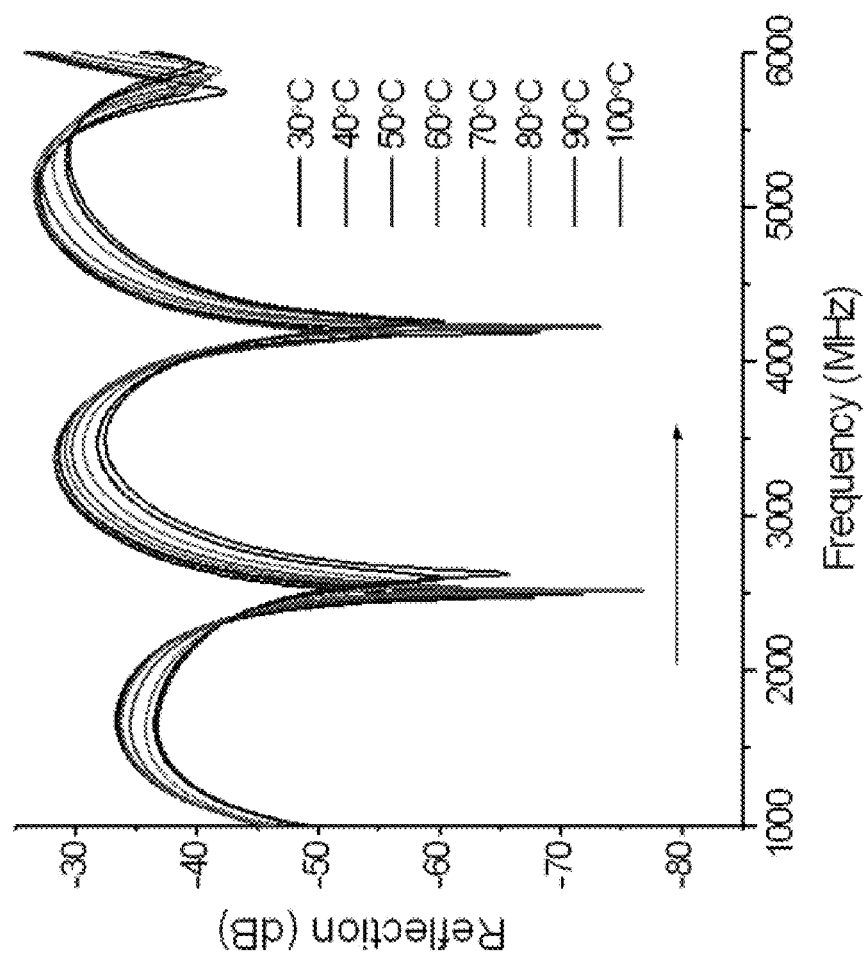
FIG. 7B illustrates temperature responses of the third CCFPI along one coaxial cable according to aspects of the invention.
Figure 7C:
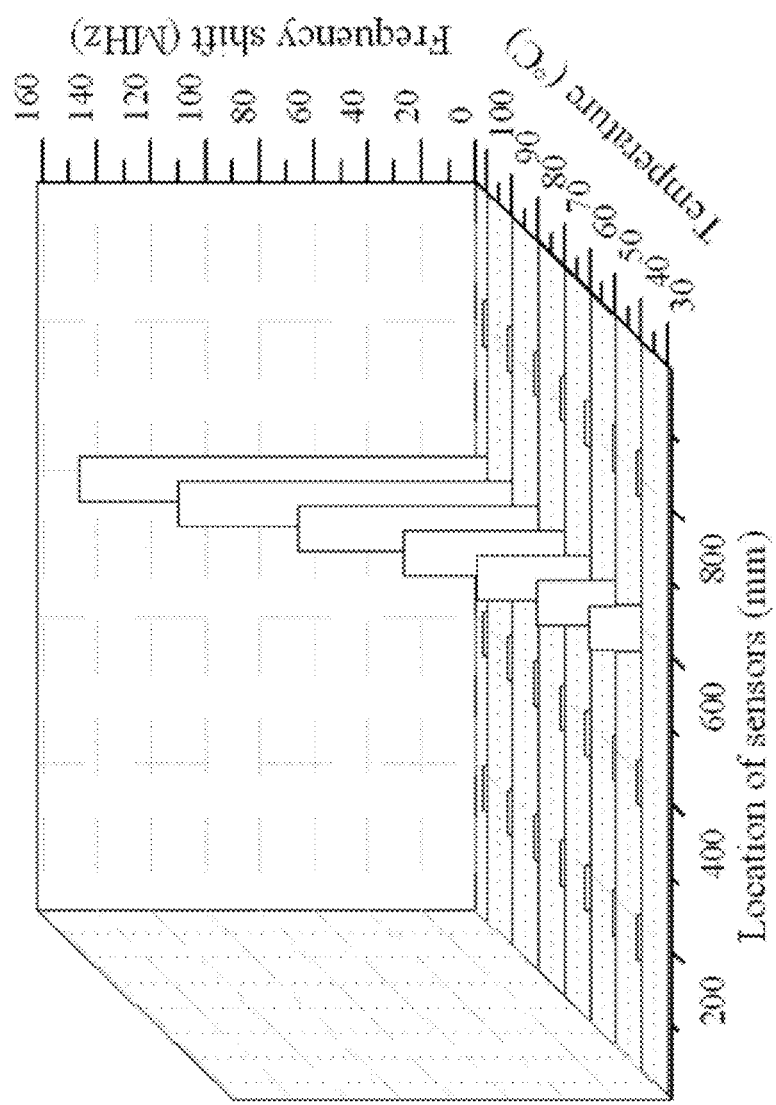
FIG. 7C illustrates temperature distribution of a total cable with four sensors and their frequency shift as a function of temperature according to aspects of the invention.

To demonstrate the capability of distributed sensing according to the invention, temperature measurement was conducted. The third CCFPI along the coaxial cable was placed into a tubular furnace while the others are placed outside the furnace. Furnace temperature was increased from 30 to 100° C. at a step of 10° C. During each temperature step, the reflection spectrum was recorded and the interferograms in spectrum domain of the four CCFPIs were reconstructed. FIGS. 7A and 7B plot the change in reconstructed interferograms of the second and third CCFPI, respectively. The interference fringe of the second sensor does not change as temperature increased; while the third sensor's interference fringe shifts to the right side as expected in FIG. 4. FIG. 7C plots the calculated temperature distribution of the total cable with four sensors and their frequency shift as a function of temperature. It is obvious that only the third sensor, which is placed in the furnace, has the maxima frequency shift as temperature increased. The other sensors also have a ±1 MHz shift, corresponding to a temperature variation of ±0.8° C. As such, the proposed signal processing device and method for distributed sensing has little cross-talk among sensors along the cable. Temperature measurement based on this device and method is just an example to demonstrate its capability of distributed sensing. The proposed device and method for distributed sensing based on coaxial cable can be designed for measurement of various physical, chemical and biological parameters such as the monitoring of displacement, strain, temperature, pressure, acoustic/ultrasonic waves, liquid level, material property, etc.

Optical Fiber Based Microwave Fabry Perot Interferometer

An alternative way of demonstrating distributed sensing according to the invention is to use optical fiber based microwave Fabry Perot interferometers. Recently, we have successfully developed optical carrier based microwave interferometers (OCMIs) for sensing application. The fundamental idea is to use a microwave signal to modulate optical waves. The envelop-modulated optical waves can be sent through an optical fiber to reach a long distance due to the very small optical loss. The microwave signal superimposed on an optical wave can now be transmitted over a much longer distance inside an optical fiber. The reason of using microwave signal is because the phase information in spectrum domain can be easily measured, and the phase information is the key point to obtain the location information for every reflection along an optical fiber. As such, the proposed device and method of distributed sensing can also be implemented in optical fiber.

Figure 8:
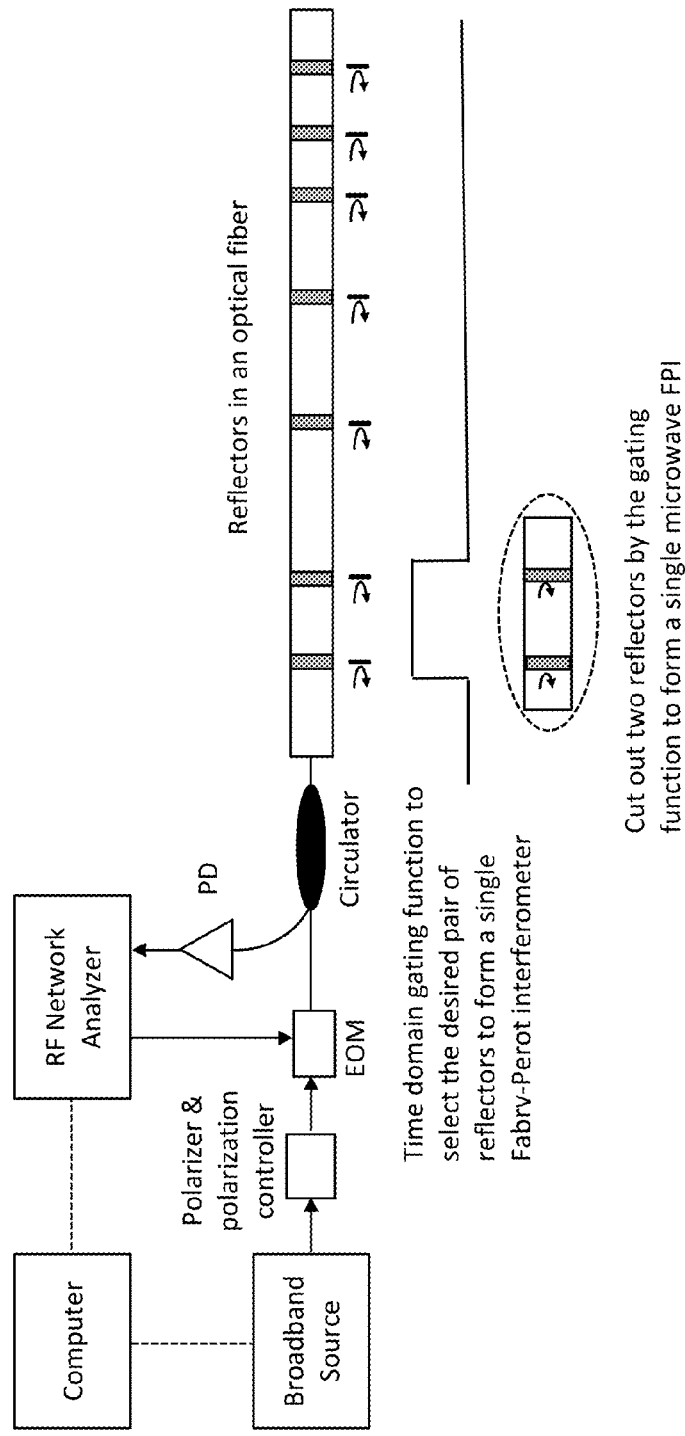
FIG. 8 illustrates a distributed sensing network based on fs laser induced optical fiber microwave Fabry Perot interferometers and the instrumentation for interrogation according to aspects of the invention.

FIG. 8 shows a distributed sensing network based on femto-second (fs) laser induced optical fiber microwave Fabry Perot interferometers and the instrumentation for interrogation. The fs laser beam can be directly focused into the core of an optical fiber and create a reflector with minima reflectivity and transmission loss. The reflectivity of an fs laser induced reflector is about −30 dB which is even smaller than that of hole-drilling method on a coaxial cable. As such, a large multiplexing capacity can be implemented through this device and method. The reflection spectrum of the sensing system in microwave domain can be obtained via the technology of OCMI. After obtaining its reflection spectrum (including magnitude and phase information), the signal processing device and method is the same as that of the coaxial cable case.

To demonstrate the proposed device and method for distributed sensing based on optical fiber, three sections of optical FPIs were separated periodically by 120 mm on an optical fiber, respectively. Each optical FPI were formed by two reflectors. Each reflector was made of a capillary tube sandwiched in between two regular single mode fibers. The length of the tube was approximately tens of micrometers. The two interfaces in the tube cannot be resolved in microwave domain. Only one reflection for the tube can be obtained through microwave instruments. The distance between two consecutive tubes was 50 mm, which was relative to the optical path difference (OPD) of an optical FPI. The OPD is larger than the coherence length of the optical carrier source but smaller than the coherence length of the microwave signal used to modulate the optical carrier. As a result, the two reflected beams superimposed incoherently in optical domain but coherently in microwave domain. When observed using the developed OCMI setup, the interference signal can be observed in the microwave domain.

As shown in FIG. 8, a broadband light source provides a light signal which is intensity modulated with a microwave signal provided by a microwave network analyzer through an electro-optic modulator (EOM) in communication with a waveguide such as an optical fiber. An optional fiber inline polarizer and an optional polarization controller may be used before the EOM modulation to condition the light signal to enhance the modulation efficiency. The microwave signal and detection of modulated microwave signals reflected by the sensors are realized through the microwave network analyzer (e.g., an RF network analyzer such as a VNA). The intensity modulated light signal provided by the EOM is routed to cascaded microwave FPI sensors via an optical circulator (i.e., a multiport opto-coupler providing coupling without any substantial loss). The sensors consist of multiple reflectors which are fabricated in the core region of the optical fiber by fs laser direct micromachining. The circulator communicates the light signal reflected by the sensors via a phase detector (PD) to the analyzer for demodulation. A processor such as a computer analyzes the interrogation light signal (e.g., the modulated carrier signal) as compared to the demodulated reflected signal to determine the sensor readings. A gating function selects the reflected signal from a desired sensor for demodulation and evaluation. The amplitude and phase of each reflected signal from each sensor is distinguished in the time domain and the modulated signal is reconstructed in the frequency domain.

Figure 9A:
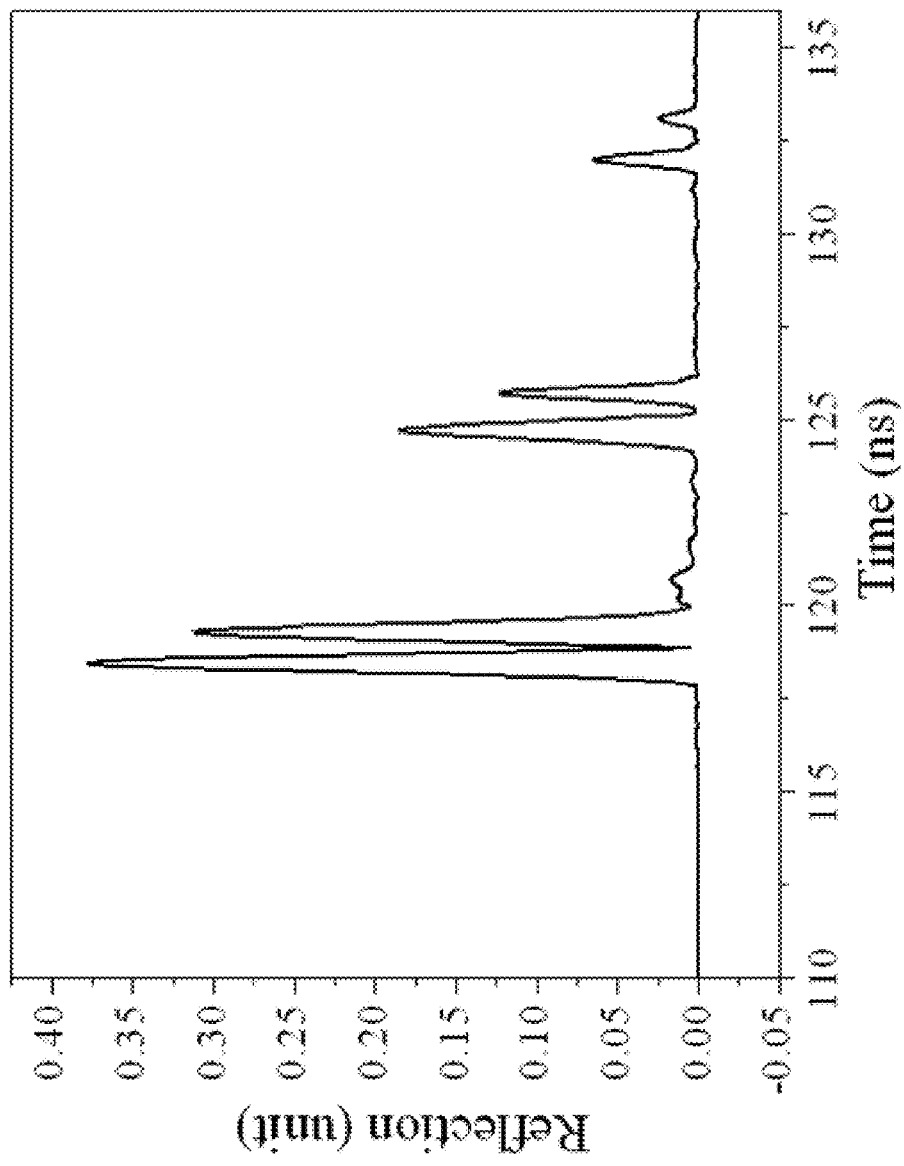
FIG. 9A illustrates a Proof of Concept for a time domain signal after applying a complex inverse Fourier transform to the spectrum according to aspects of the invention.
Figure 9B:
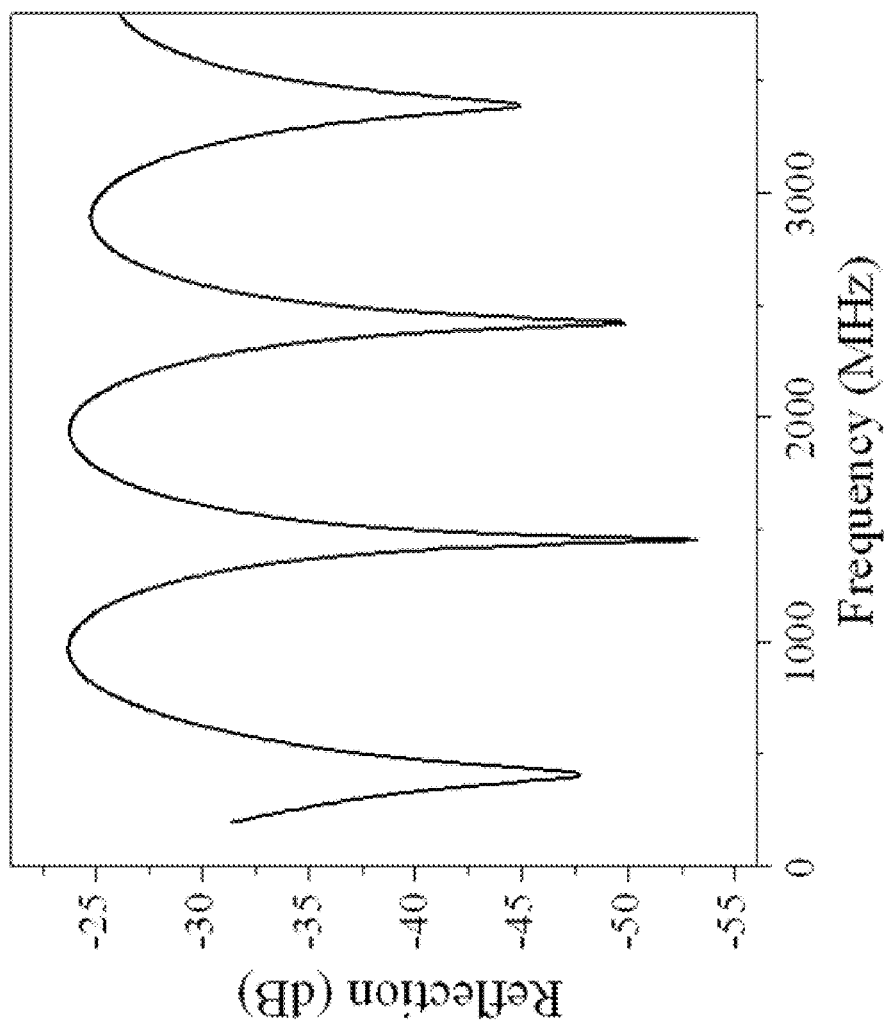
FIG. 9B illustrates a Proof of Concept isolating and reconstructing an optical fiber based microwave FPI from three cascaded FPIs according to aspects of the invention.
Figure 10A:
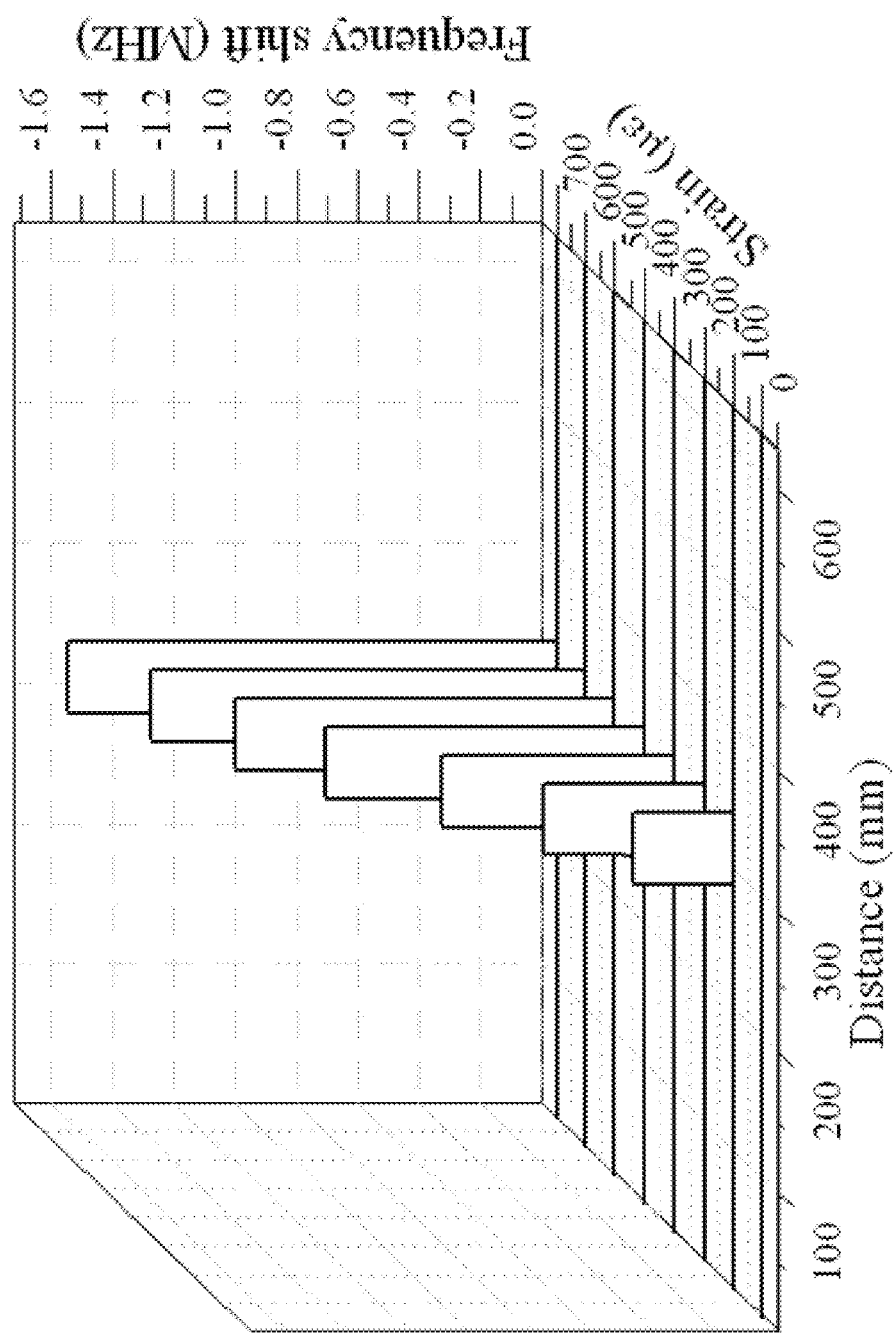
FIG. 10A illustrates a strain distribution of an optical fiber with three multiplexed sensors according to aspects of the invention.
Figure 10B:
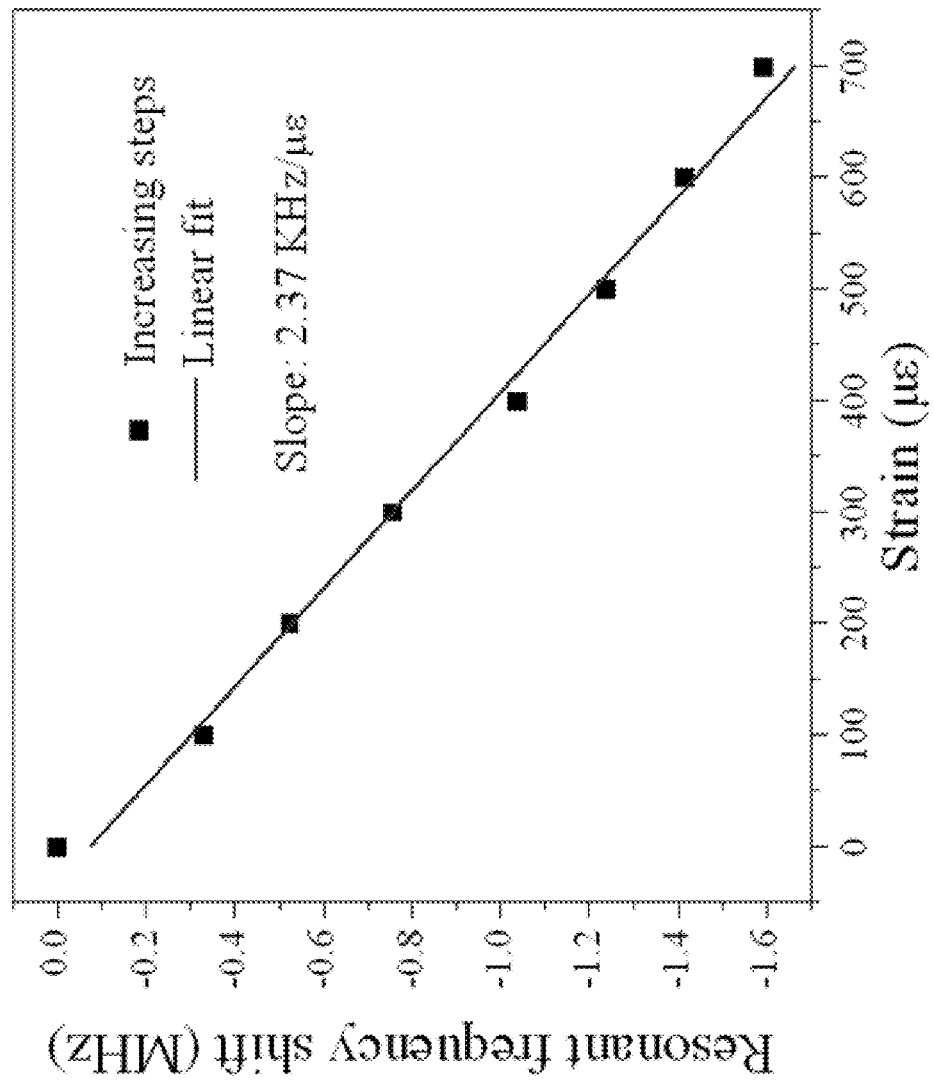
FIG. 10B illustrates a frequency shift of the second sensor as a function of applied strain according to aspects of the invention.

FIG. 9A plots the time domain signal after applying a complex inverse Fourier transform to the measured spectrum. Six reflections (three microwave FPIs) can be clearly observed in time domain. Their amplitudes are gradually decreased due to the large reflectivity and transmission loss of the capillary tube. FIG. 9B plots the reconstructed interferogram of the second FPI in spectrum domain through the proposed signal processing device and method. The fringe visibility is over 20 dB and the free spectral range of the interferogram is about 1 GHz. To demonstrate its capability of distributed sensing, strain measurement was conducted. The strain was applied on the second sensor and increased at a step of 100 µε. FIG. 10A plots the applied strain distribution of the optical fiber with three sections of sensors. The second sensor has an obvious response to the applied strain while the other sensors have no responses. FIG. 10B shows the second sensor in response to applied axial strain, where the frequency shift of the interferogram is a linear function of the applied strain with a slope of −2.37 kHz/µε. As such, the proposed device and method for distributed sensing based on optical fiber works well and can be designed for measurement of various physical, chemical and biological parameters similar to the well-known all-optical fiber FPIs. Example applications include the monitoring of displacement, strain, temperature, pressure, acoustic/ultrasonic waves, refractive index, liquid level, gas or vapor concentration, biological quantity, etc.

The distributed sensing device and method uses coaxial cable or optical fiber based Fabry-Perot interferometers. Higher spatial resolution, improved measurement accuracy and multiplexing capability are achieved. The distributed sensing device and method find several applications such as water pollution monitoring, corrosion sensing, or oil pipe leakage detection. Due to effectiveness and robustness, the device and method may also be used for structural, down hole or under water applications.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:
1. A interferometer comprising:
a waveguide;

a plurality of sensors within the waveguide wherein each sensor comprises two reflectors which have a relatively weak reflection coefficient and insertion loss;

a broadband light source in communication with the waveguide for providing a light signal for interrogating each of the plurality for sensors; and an analyzer measuring distributed interferometer signals from the sensors by modulating the light signal with a microwave signal, by demodulating and evaluating light signals reflected by the sensors, and by analyzing the interrogation signals as compared to the demodulated, reflected light signals to determine each sensor reading and to determine changes in optical length relative to the sensors wherein the analyzer distinguishes an amplitude and a phase of each reflected microwave signal from each sensor in the time domain and the modulated microwave signal is reconstructed in the frequency domain to acquire the amplitude and phase spectrum of the microwave signal so that the location of the reflectors can be identified and isolated in order to construct the interferometer for sensing.

2. The device of claim 1 wherein the waveguide comprises an optical waveguide.

3. The device of claim 2 wherein the optical waveguide comprises an optical fiber.

4. A device comprising:
a waveguide;
a plurality of sensors within the waveguide;
a broadband light source in communication with the waveguide for providing a light signal for interrogating each of the plurality for sensors; and
an analyzer for modulating the light signal with a microwave signal and for demodulating and evaluating light signals reflected by the sensors wherein the analyzer comprises:
 a microwave network analyzer providing the microwave signal;
 an electro-optic modulator responsive to the network analyzer for modulating the light signals provided to the waveguide with the microwave signal;
 a phase detector for detecting the phase of the reflected signals and providing the phase detected signals to the microwave network analyzer wherein the microwave network analyzer demodulates the reflected light signals; and
 a processor for analyzing the interrogation signals as compared to the demodulated, reflected light signals to determine each sensor reading.

5. The device of claim 4 wherein the waveguide comprises an optical waveguide.

6. The device of claim 5 wherein the optical waveguide comprises an optical fiber.

7. A distributed sensing demodulation device comprising:
a waveguide;
a plurality of sensors in communication with the waveguide wherein each sensor comprises two reflectors which have a relatively weak reflection coefficient and insertion loss and wherein every two consecutive reflectors comprise a Fabry-Perot interferometer (FPI);
a joint-time-frequency analyzer measuring distributed interferometer signals from the sensors by phase detecting signals reflected by the FPIs so that an interrogation signal reflected by each sensor is distinguished via time domain and wherein the analyzer analyzes interferometer signals in a spectrum domain of each individual FPI to determine each sensor reading which manifest as an interferogram wherein the interferometer signals from the sensors comprise reflections generated by impedance discontinuities wherein the analyzer distinguishes an amplitude and a phase of each reflected microwave signal from each sensor in the time domain and the modulated microwave signal is reconstructed in the frequency domain to acquire the amplitude and phase spectrum of the microwave signal so that the location of the reflectors can be identified and isolated in order to construct the distributed sensing demodulation device for sensing.

8. The device of claim 7 wherein the waveguide comprises one of a microwave waveguide or an optical waveguide.

9. The device of claim 8 wherein the microwave waveguide comprises a coaxial cable and wherein the optical waveguide comprises an optical fiber.

10. A method for use with a waveguide and a plurality of sensors within the waveguide wherein each sensor comprises two reflectors which have a relatively weak reflection coefficient and insertion loss, said method comprising:
providing a light signal to the waveguide for interrogating each of the plurality for sensors; and
measuring distributed interferometer signals from the sensors by
 modulating the light signal provided to the waveguide with a microwave signal;
 demodulating and evaluating light signals reflected by the sensors; and
 analyzing the interrogation signals as compared to the demodulated, reflected light signals to determine each sensor reading and to determine changes in optical length relative to the sensors wherein the analyzing distinguishes an amplitude and a phase of each reflected microwave signal from each sensor in the time domain and the modulated microwave signal is reconstructed in the frequency domain to acquire the amplitude and phase spectrum of the microwave signal so that the location of the reflectors can be identified and isolated in order to construct an interferometer for sensing.

11. The device of claim 10 wherein the waveguide comprises an optical waveguide.

12. The device of claim 11 wherein the optical waveguide comprises an optical fiber.

13. A distributed sensing demodulation method for use with a waveguide and a plurality of sensors in communication with the waveguide wherein each sensor comprises two reflectors which have a relatively weak reflection coefficient and insertion loss and wherein every two consecutive reflectors comprise a Fabry-Perot interferometer (FPI), said method comprising measuring distributed interferometer signals from the sensors by:
phase detecting signals reflected by the FPIs so that an interrogation signal reflected by each sensor is distinguished via time domain; and
analyzing an interferogram in a spectrum domain of interferometer signals of each individual FPI to determine each sensor reading wherein the interferometer signals from the sensors comprise reflections generated by impedance discontinuities wherein the analyzing distinguishes an amplitude and a phase of each reflected microwave signal from each sensor in the time domain and the modulated microwave signal is reconstructed in the frequency domain to acquire the amplitude and phase spectrum of the microwave signal so that the location of the reflectors can be identified and isolated in order to construct the interferometer for sensing.

14. The device of claim 13 wherein the waveguide comprises one of a microwave waveguide or an optical waveguide.

15. The device of claim 14 wherein the microwave waveguide comprises a coaxial cable and wherein the optical waveguide comprises an optical fiber.

* * * * *